(12) United States Patent
Salazar

(10) Patent No.: US 10,857,494 B2
(45) Date of Patent: Dec. 8, 2020

(54) EXHAUST CONFIGURATION FOR A WET SCRUBBER

(71) Applicant: GIFFIN, INC., Auburn Hills, MI (US)

(72) Inventor: Abraham J. Salazar, Lake Orion, MI (US)

(73) Assignee: GIFFIN, INC., Auburn Hills, MI (US)

( * ) Notice: Subject to any disclaimer, the term of this patent is extended or adjusted under 35 U.S.C. 154(b) by 238 days.

(21) Appl. No.: 15/777,520

(22) PCT Filed: Oct. 6, 2016

(86) PCT No.: PCT/US2016/055715
§ 371 (c)(1),
(2) Date: May 18, 2018

(87) PCT Pub. No.: WO2017/062597
PCT Pub. Date: Apr. 13, 2017

(65) Prior Publication Data
US 2018/0339252 A1    Nov. 29, 2018

Related U.S. Application Data

(60) Provisional application No. 62/238,352, filed on Oct. 7, 2015.

(51) Int. Cl.
*B01D 45/04*    (2006.01)
*B01D 47/00*    (2006.01)
(Continued)

(52) U.S. Cl.
CPC ............. *B01D 45/04* (2013.01); *B01D 47/00* (2013.01); *B01D 47/024* (2013.01); *B05B 14/43* (2018.02); *B05B 14/468* (2018.02); *B05B 16/00* (2018.02); *B01D 2247/10* (2013.01); *B01D 2247/14* (2013.01)

(58) Field of Classification Search
CPC ...... B01D 45/04; B01D 47/00; B01D 47/024; B01D 2247/10; B01D 2247/14; B05B 14/468; B05B 14/43; B05B 16/00
USPC .... 95/214, 262, 267, 268, 273; 96/190, 215, 96/322; 454/49; 118/326, 663, 668, 323; 55/308, 322, 326, 442, 385.1, DIG. 46
See application file for complete search history.

(56) References Cited

U.S. PATENT DOCUMENTS 4,053,292 A    10/1977    Schneider et al.
4,704,952 A *  11/1987    Johnson .................. B05B 14/46
                                                                454/54
(Continued)

FOREIGN PATENT DOCUMENTS

JP    2001-025692    1/2001

OTHER PUBLICATIONS

International Search Report and Written Opinion of PCT/US2016/055715 dated Jan. 17, 2017.
(Continued)

*Primary Examiner* — Minh Chau T Pham
(74) *Attorney, Agent, or Firm* — Dickinson Wright PLLC

(57) ABSTRACT

An exhaust configuration for a wet scrubber. The exhaust configuration includes a diffuser that is attached to the wet scrubber and which defining an outlet for discharging scrubbed air and paint laden water from the wet scrubber. Attached on lateral sides of the diffuser are wings. The wings extend away from the outlet.

13 Claims, 4 Drawing Sheets

(51) Int. Cl.
*B05B 14/468* (2018.01)
*B05B 14/43* (2018.01)
*B05B 16/00* (2018.01)
*B01D 47/02* (2006.01)

(56) References Cited

U.S. PATENT DOCUMENTS

| | | | |
|---|---|---|---|
| 5,020,470 A | 6/1991 | West et al. | |
| 5,147,422 A * | 9/1992 | Neeley | B05B 14/468 |
| | | | 95/210 |
| 5,264,014 A * | 11/1993 | Lannefors | B05B 14/42 |
| | | | 96/44 |
| 5,626,651 A * | 5/1997 | Dullien | B01D 45/04 |
| | | | 55/308 |
| 6,024,796 A * | 2/2000 | Salazar | B05B 14/46 |
| | | | 118/326 |
| 6,162,270 A * | 12/2000 | Nystrom | B05B 14/469 |
| | | | 55/385.2 |
| 2002/0189449 A1 | 12/2002 | Klobucar et al. | |
| 2007/0166463 A1 * | 7/2007 | Kelly | B05B 14/468 |
| | | | 427/345 |
| 2010/0212498 A1 | 8/2010 | Salazar | |
| 2010/0293909 A1 * | 11/2010 | Thomason | B05B 14/46 |
| | | | 55/385.1 |
| 2016/0158787 A1 * | 6/2016 | Salazar | B05B 14/43 |
| | | | 118/323 |

OTHER PUBLICATIONS

Preliminary Report on Patentability of PCT/US2016/055715 dated Apr. 19, 2018.

* cited by examiner

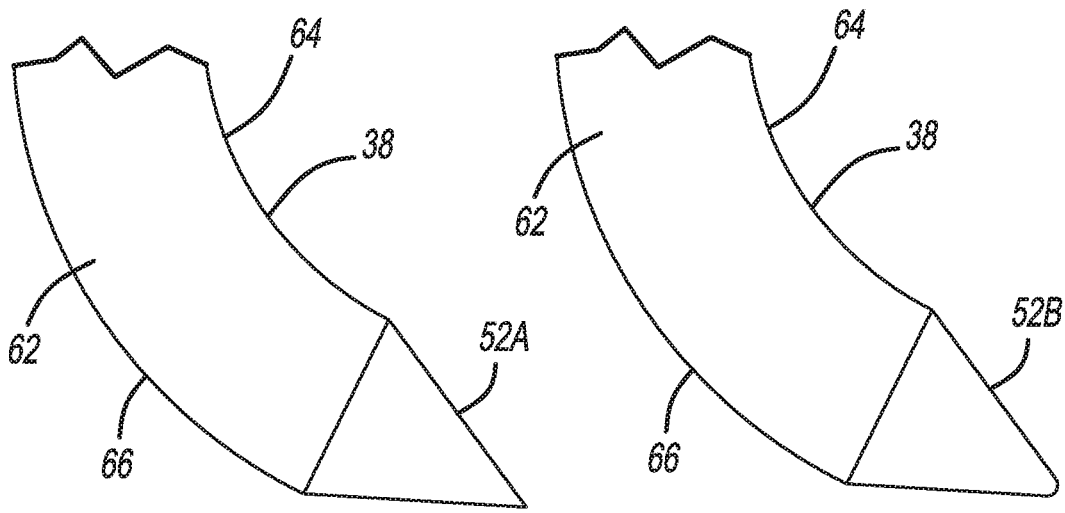
*FIG - 6A*  *FIG - 6B*
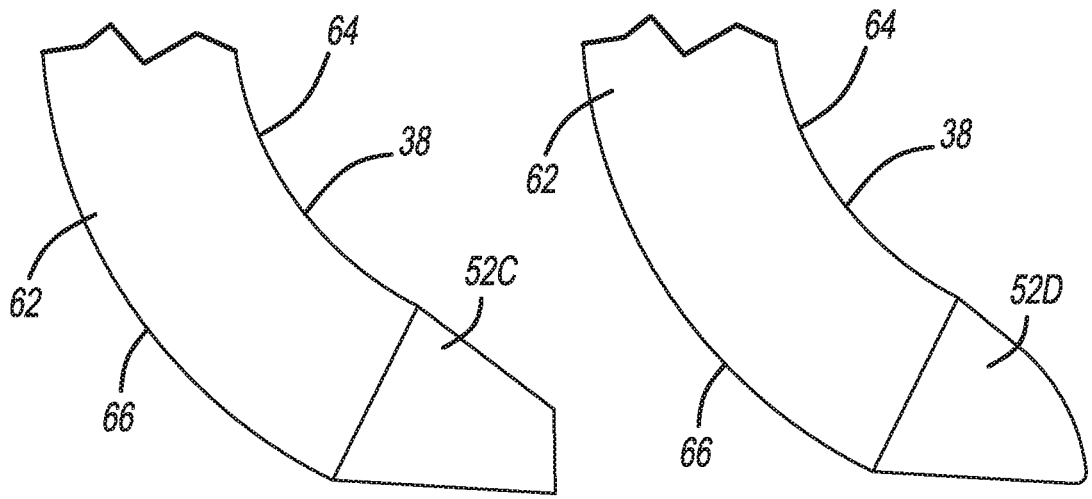
*FIG - 6C*  *FIG - 6D*
   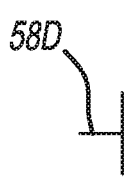
*FIG - 7A*  *FIG - 7B*  *FIG - 7C*  *FIG - 7D*

EXHAUST CONFIGURATION FOR A WET SCRUBBER

CROSS-REFERENCE TO RELATED APPLICATIONS

This application is a 35 U.S.C. § 371 national phase application of PCT International Application No. PCT/US2016/055715, filed Oct. 6, 2016, which claims the benefit of priority under 35 U.S.C. § 119 to U.S. Provisional Application No. 62/238,352, filed Oct. 7, 2015, the contents of which are incorporated herein by reference in their entirety.

BACKGROUND

1. Field of the Invention

The present invention generally relates to spray booths for applying paint to units in a production environment, such as for motor vehicle bodies. More specifically, the invention relates to exhaust configuration for a wet scrubber, such as those used in connection with paint spray booths.

2. Description of Related Art

Many industrial processes require the application of a coating to a workpiece. For instance, applying a surface coating (e.g. paint) to an object requires fluid or powders, such as a liquid or powder slurry, to be sprayed or otherwise applied to the desired surfaces. Typically, this fluid application will occur in a contained environment that enables control of the applied fluid. For example, paint is often applied in a paint spray booth will enclosure that allows for control of the atmospheric conditions and containment of the paint.

Inherent in the paint spraying process is overspray. Overspray is paint that does not adhere to the object being painted and floats in the air as a mist. In order to provide a safe working environment, a high quality finished product, and to control atmospheric emissions, paint spray booths require a substantially continuous supply of clean, fresh air. This clean, fresh air also assists with the evacuating and discharge of the overspray from the spray booth.

Various configurations of spray booths have been developed for different fluid application processes and for the recovery of the overspray. These booths are often classified by the direction of the airflow in the spraying area. For instance, cross-draft booths create an airflow that moves parallel to the floor from behind the operator or spray robot toward a dry filter or a water curtain. Downdraft booths have an airflow which moves from the ceiling vertically downward to an exhaust system located below the floor. Semi-downdraft booths include an airflow that moves in a diagonal direction in the booth towards an exhaust.

Since the overspray or paint mist contains paint particles, it is important to filter or otherwise clean this exhausting air before discharging it into the atmosphere and the environment. Several methods have been developed for separating the paint mist from the air exhaust stream. For instance, one known method forces air entrained with paint through a dry filter or screen. The filter absorbs or otherwise captures the paint particles. Another method requires the air entrained with paint to contact and be mixed with a liquid, such as water, so that the paint particles are captured by the fluid. The former method is known as a dry scrubber, while that latter is known as a wet scrubber.

Due to the large amount of paint used by many industrial paint facilities, including automotive production plants, the wet method in a downdraft booth is a preferred configuration. These booths generally have a wet scrubber that captures the fluid overspray and assists with separating the paint particles from the air.

Over time, various configurations of wet scrubbers have been developed in an attempt to increase the efficiency of the particle separation and to minimize operating costs for the paint facility. Such systems have included gravity based systems where paint laden airflow is made to pass through a bulk liquid, downwardly spilling systems where the airflow passes through a film formed from the liquid, spray systems where the airflow passes through a spray of the liquid and restriction systems where the airflow and the liquid pass through a restriction or Venturi to accelerate the air, generate turbulence, and break-up the supply water (or the capturing fluid) running along its walls. With the latter system, the water is broken-up into small drops that capture or trap the paint particles in the exhaust air within the droplets. Another type of wet scrubber utilizes an elongated tube whereby water flows downward along the walls of the tube and into a pool of liquid contained within a capturing chamber. A nozzle is positioned at the tube's exit to generate turbulence in both the water flow and exhaust air, resulting in the paint particles in the air being captured or trapped within the water. Still other scrubber designs utilize a vortex chamber in which paint laden air follows a spiral path to the center of the chamber where it proceeds out of the chamber. The paint particles are captured by water that is either sprayed outward within the vortex chamber or introduced to the airflow before introduction of both the air and the water into the vortex chamber. The spiral path within the vortex chamber causes the heavier paint laden water droplets to slow along the exterior walls of the vortex chamber causing them to collect at the bottom thereof.

BRIEF DESCRIPTION OF THE DRAWINGS

FIGS. 6(A-D) show various configurations of wings.

FIGS. 7(A-D) show various configurations of end wall splitters.

DESCRIPTION

The present invention relates to the configuration of the exhaust of a wet scrubber. As will be apparent to those skilled in the field of the present invention, the exhaust configuration is not limited to a particular style of wet scrubber and may be utilized in connection with a wide varieties of wet scrubber including, without limitation, those mentioned in the background section hereof.

Figure 1:
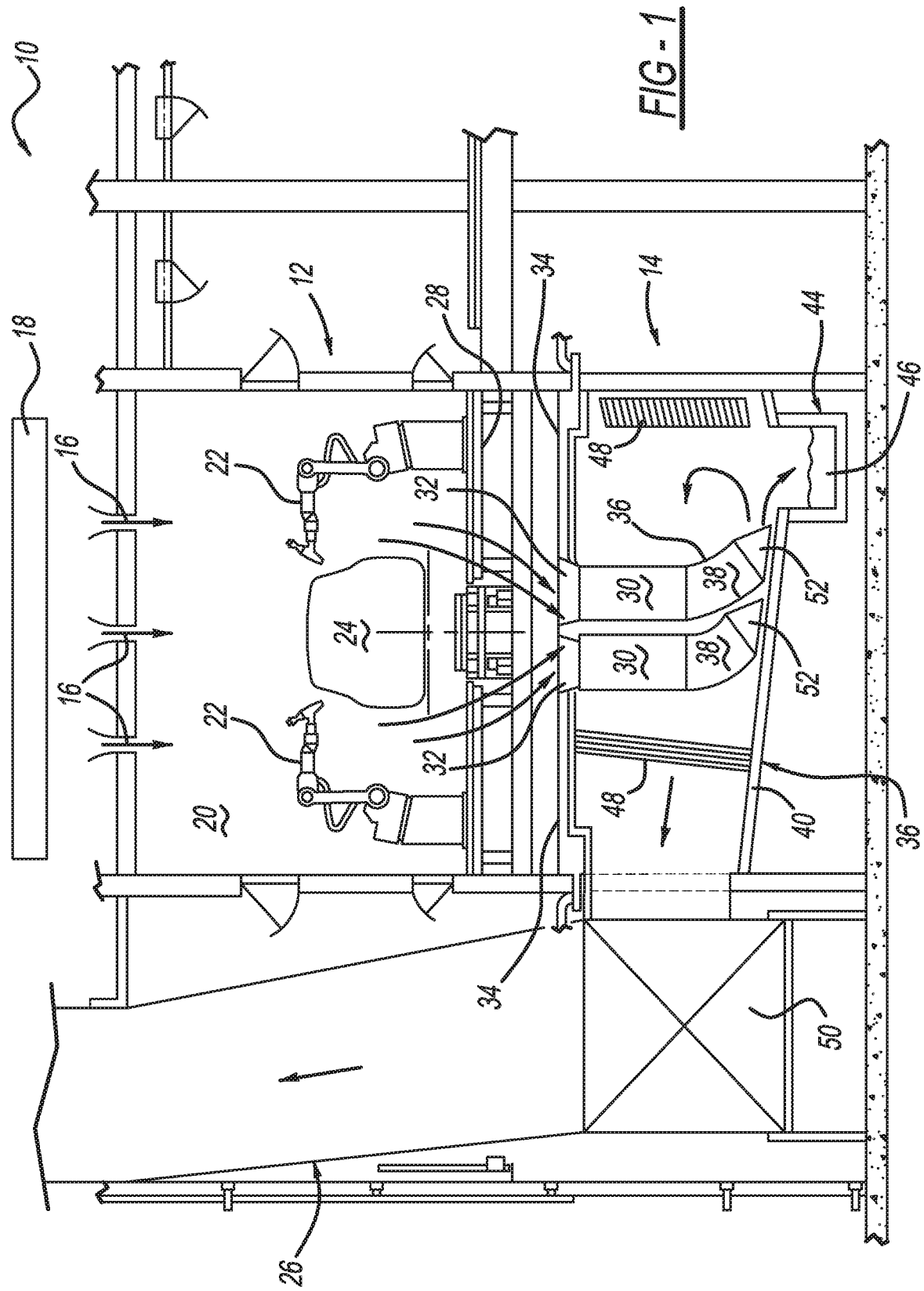
FIG. 1 is a schematic view of a paint spray booth having a wet scrubber assembly incorporating the principles of the present invention.

Typical automotive spray booths are manufactured in modular sections that are repeated lengthwise to create the complete booth. As seen in FIG. 1, a modular paint spray booth 10 includes an upper or spraying section 12 and an under or capturing section 14. The upper section 12 is in fluid communication with an air supply 16, such as ambient air blown in from outside the booth. Some of this air from the air supply 16 may be directed through filters 18 to a spraying area 20 that contains a plurality of paint spray guns 22. As a workpiece, which for illustration purposes is an automobile body 24, enters the spraying area 20, the paint spray guns 22 are activated to deliver paint to the body 24.

During this spraying, paint that does not stick to the body 24 floats in the air as paint mist or overspray. With the assistance of an exhaust fan assembly 26, the flowing air and paint mist are directed from the spraying area 20, through a floor grating 28 and towards an inlet 32 of a wet scrubber 30, the details of which are further discussed below. Depending on the amount of air flow handled by the paint spray booth 10, the module of the paint spray booth 10 may include one or more wet scrubbers 30 with a common central inlet or individual inlets.

In one configuration of a wet scrubber 30, the inlet 32 to the wet scrubber 30 is mounted in a sealed manner to what is known as a flooded floor 34, which is a floor having a film or flow of water that is also directed to the inlet 32. Since the inlet 32 provides the only exit path for the paint laden air from the spraying area 20, a mixture of water from the flooded floor 34 and air entrained with paint particles enters the inlet 32 of the wet scrubber 30 together.

In the wet scrubber 30, the paint mist is separated from the air and entrapped within the water. The precise method by which the paint mist is separated from the air will depend on the variety of wet scrubber employed by the spray booth 10. Such details of operation are well known by those of skill in the art and, accordingly, in the interest of brevity, are not and need not be further discussed herein. Additionally, such details are not required for an understanding of the principles of the invention described hereafter.

The under section 14 further includes an exhaust enclosure 36. Within the exhaust enclosure 36, the water and scrubbed air exit the wet scrubber 30 by way of a flow director or diffuser 38 that empties the water onto a floor 40 of the exhaust enclosure 36, which may be the floor of the under section 14. Ideally, the water containing the paint particles captured in the wet scrubber 30 flows out of an outlet 42 of the diffuser 38, along the floor 40 of the exhaust enclosure 36 and into a sluice 44. Preferably, the floor 40 of the exhaust enclosure 36 is sloped toward the sluice 44. From the sluice 44, the paint laden water 46 may be collected for treatment and recycling or disposal, as desired. The flow director/diffuser configuration described previously is primarily directed to the scrubber in U.S. Pat. No. 8,241,405, which is hereby incorporated by reference.

Air exiting the outlet 42 of the diffuser 38 is routed toward an exhaust plenum 50 of the exhaust assembly 26, but may have a minimal amount of paint particles and water droplets suspended therein. To capture the residual water droplets and paint particles, en route to the exhaust plenum 50, the air proceeds through a plurality of baffles or mist eliminators 48 where the residual paint particles and water droplets are further collected. Finally, the air passes through the exhaust assembly 26 where it may be directed through a final exhaust filter or filter system (not shown) before it is discharged into the surrounding environment.

Diffuser 38 is provided in the form of a generally rectangular or square cross-section closed duct with side walls 62, top wall 64 and bottom wall 66. Attached to end of the diffuser 38 and located laterally adjacent to the sides of the outlet 42 is a pair of flow directors or wings 52 which extend from the sidewalls 62. For simplicity and ease of fabrication, the wings 52 presented herein are flat and generally triangular in shape. The surface of the wings 52, however, need not necessarily be flat. Rather, in the direction proceeding from the outlet 42 toward a distal end or tip 54 of the wing 52, a curved shape may be employed. Specifically, partially circular, parabolic or other curved shapes could be used to efficiently provide a smooth and gradual deceleration of the flow of air out of the outlet 42. The depicted triangular shape of the wings 52 could also be varied. For example, the tip 54 of the wing 52 may be rounded or otherwise truncated to avoid sharp points or edges that could be encountered during handled, installation or maintenance of the scrubber 30. Additionally, the triangular shape of the wings can be substituted with a rectangular shape, a rounded shape, a parabolic, etc. In each case, the wings could be flat or curved (as previously discussed), all with the purpose of enhancing deceleration of the exhaust airflow and the further separation of any entrained water droplets. Examples of such alternative shapes for wing 52 are shown by FIG. 6 (A-D), including triangular 52A (FIG. 6A), round tip triangular 52B (FIG. 6B), trapezoidal 52C (FIG. 6C), and rounded edge 52D (FIG. 6D). In each case wings 52 have a wide attachment to diffuser sidewalls 62 and taper to tip 54.

The wings 52 are attached to the end of the diffuser 38 and are preferably positioned such that their lower edge is close to but not touching the floor 40 of the exhaust enclosure 36. While the precise set-off from the floor 40 will depend on the particular application, it is preferred that the set-off is small but not so small that prevents cleaning by regular means (e.g. water cannon, scrapers). In one embodiment of the present invention, a set-off distance was set at 0.5 inch. The wings 52 are located close to the floor 40 to inhibit migration of any air or water under the wings 52 and toward the exhaust assembly 26. If such a migration did occur, it could lead to paint laden water being short-circuited toward the exhaust plenum 50 and ducts, instead of toward the sluice 44.

Figure 4:
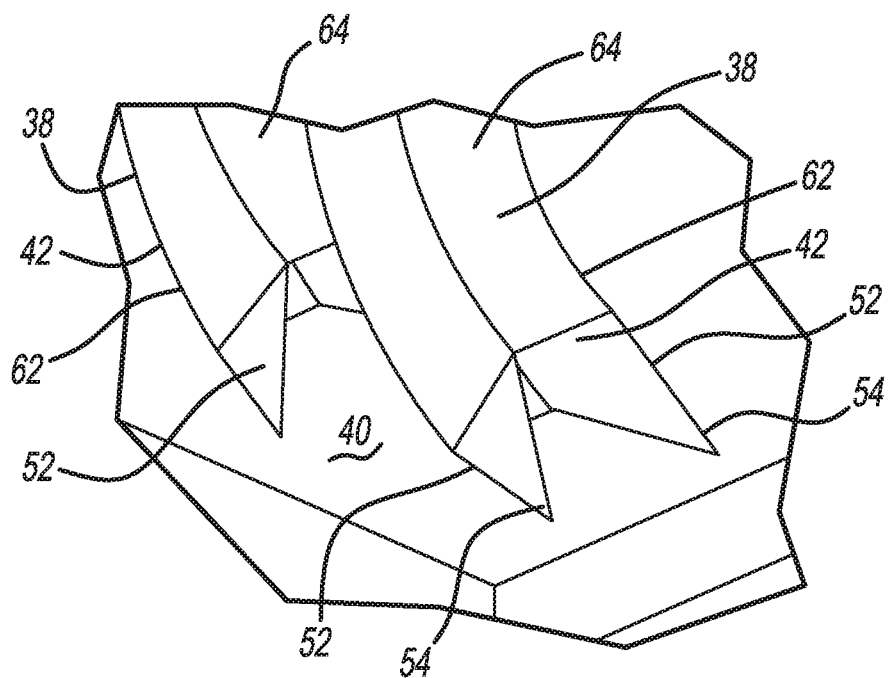
FIG. 4 is a quartering isometric view taken from the front of the exhaust configuration seen in FIGS. 1-3.
Figure 5:
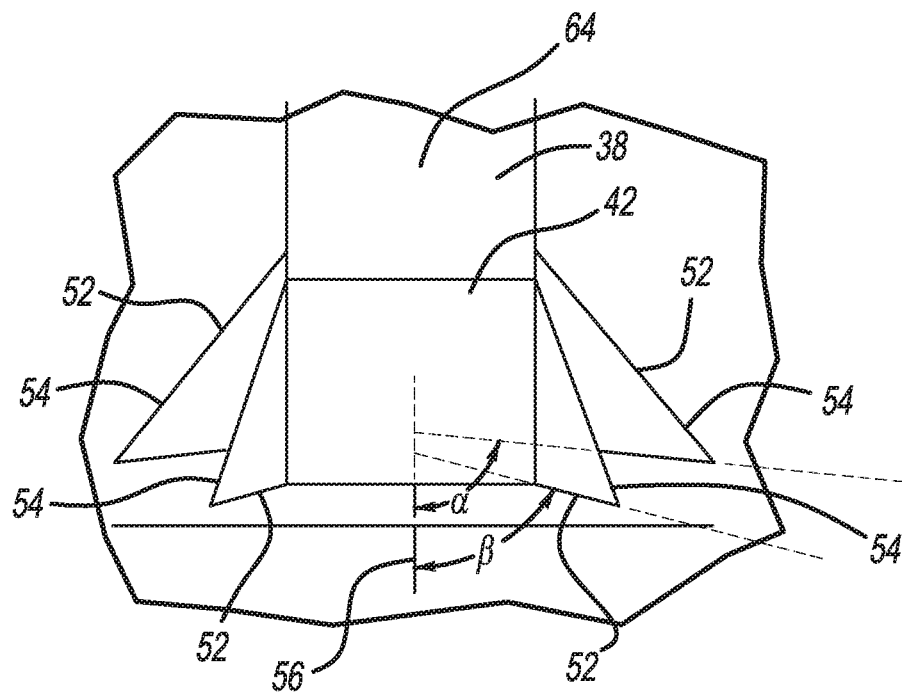
FIG. 5 is a front view of the exhaust configuration seen in FIGS. 1-4.

As seen in FIGS. 4 and 5, the wings 52 are also provided such that they angle laterally outward relative to a centerline 56 drawn from the outlet 42. The specific angle of the wings 52 will be dependent on the particular application and configuration of the under section of the booth.

As further seen in the figures, two diffusers 38 are located in the under section 14 such that they are in line with each other. In other words, one diffuser 38 is located in front of the other diffuser 38, with the rear diffuser 38 (located toward the left in the figures) exhausting into a nearby obstruction, namely the back side of the front diffuser 38. This configuration mainly applies to the scrubber described in U.S. Pat. No. 8,241,405. There is a need to take advantage of this configuration to help the air decelerate more quickly, thereby allowing further precipitation of any water droplets that are entrained in the air. Therefore, the angle $\alpha$ of the wings 52 attached to the rear diffuser 38 may be different, preferable larger, than the angle $\beta$ of the wings 52 attached to the front diffuser 38. However, there is a relationship between the angle of the wings and the distance to the obstruction. The shorter the distance to the obstruction the wider the angle.

Diffusers 38 arranged one behind the other as explained previously is one option but other configurations are possible. Other possibilities include staggered exhaust or side-by-side exhaust. The most appropriate option would depend on the configuration of the under section of the booth and the intended application. In other words, the configuration presented here with one flow director exiting behind the other is one option but others may be satisfactorily employed.

The presence of some kind of obstruction in front of the wings may make them work better. Note also that the flow directors 38 are angled against the floor 40, which is an obstruction. In other words, it could be possible to achieve the deceleration and spread of the airflow pattern by using the floor, a wall, a baffle or any other obstruction without having to use the back of the other flow director.

Figure 2:
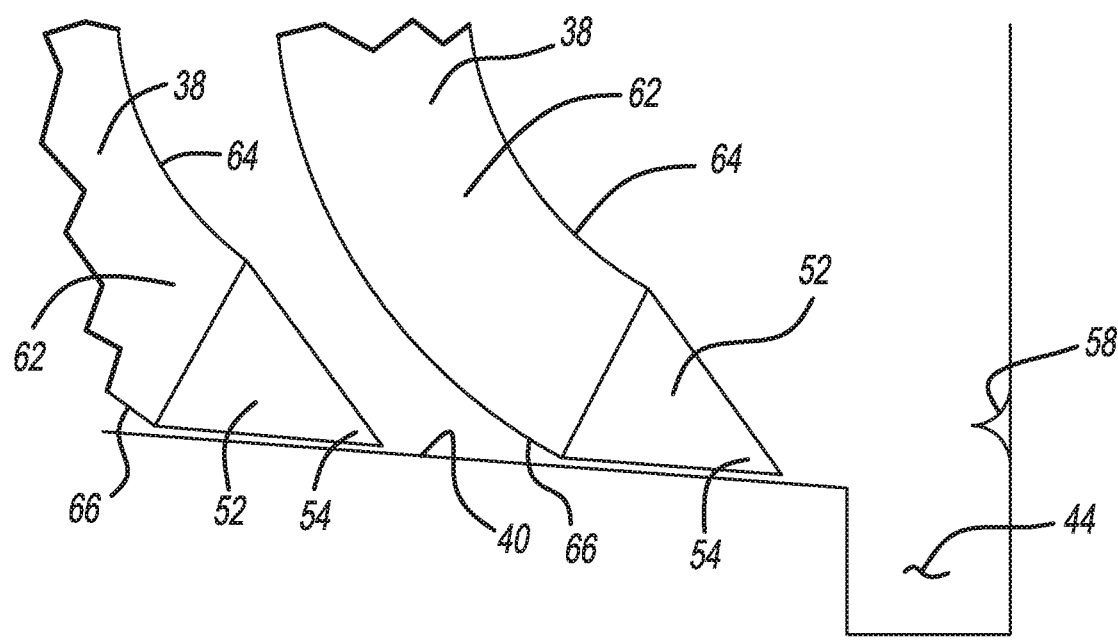
FIG. 2 is a side view of an exhaust configuration embodying the principles of the present invention.
Figure 3:
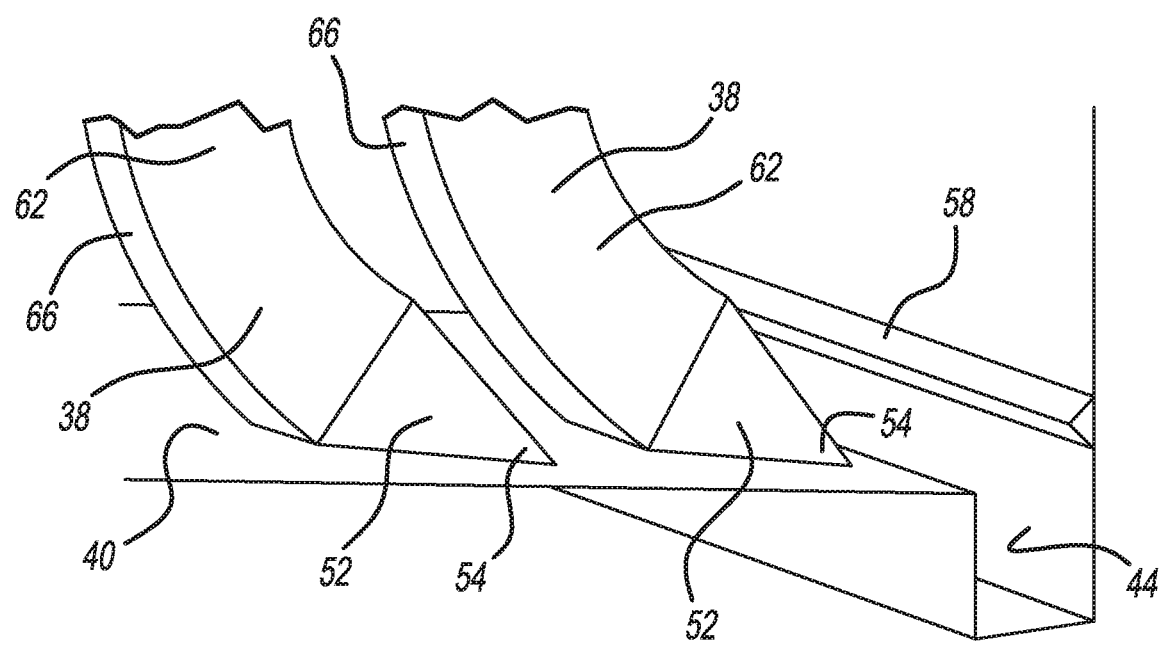
FIG. 3 is a quartering isometric view taken from the rear of the exhaust configuration seen in FIGS. 1 and 2.

The wings 52 help to push the scrubbed air and paint laden water toward the end wall of the exhaust enclosure 36 and enhancing deceleration of these streams by helping to open up the flow pattern. A pressure bar 58 may additionally be provided and positioned at or beyond the end of the floor 40 as seen in FIGS. 2 and 3. The pressure bar 58 includes upwardly and downwardly angled surfaces that are presented to the streams and that generate a local high pressure area that helps stabilize the flow pattern and separate the air and water streams by directing the paint laden water downward and the scrubbed air upward. The illustration in FIG. 3 presents triangular cross-sectioned bar 58 but other cross-sections may be used depending on the application. For example, several configurations of pressure bar 58 are shown with reference to FIG. 7(A-D), including triangular 58A (FIG. 7A), concave 58B (FIG. 7B), double-curvature convex 58C (FIG. 7C), and sharp-edged 58D (FIG. 7D). Any liquid drops still remaining within in the air at this point would have an increasingly harder time remaining in and moving upward with the decelerated air stream. Therefore, the droplets would either precipitate by gravity or attach to the end wall of the exhaust enclosure 36 and later migrate downward toward the sluice 44.

As seen from the above, the presence of the wings 52 is beneficial because the wings 52 help control and stabilize the deceleration of the air exiting the diffuser 38, help avoid short-circuiting of the air and water exiting the diffuser 38 into the exhaust plenum 50, and help direct the water and air exiting the diffuser 38 toward the sluice 44. As a result of the influence of the wings 52, the exhausted air is more dry and the chances of the air exhausted air containing paint laden water and/or paint mist are greatly reduced.

The embodiments described above were chosen to provide the best application to thereby enable one of ordinary skill in the art to utilize the disclosed inventions in various embodiments and with various modifications as are suited to the particular use contemplated. All such modifications and variations are within the scope of the invention.

The invention claimed is:

1. An exhaust configuration for a wet scrubber, the wet scrubber adapted to be installed in an under section of a paint spray booth having a floor, the exhaust configuration comprising:
 a diffuser attached to the wet scrubber adapted to be attached to the body of a wet scrubber and defining an outlet for discharging scrubbed air and paint laden water from the wet scrubber, the diffuser forming a generally rectangular cross-section closed duct having opposing generally vertically oriented side walls, a top wall, and a bottom wall; and
 a pair of wings with a wing attached to each of the side walls of the diffuser and extending away from the outlet, each of the wings tapering from a first edge joining the duct side wall and tapering to an end, and a second edge of each of the wings positioned adjacent to the floor.

2. The exhaust configuration according to claim 1, further comprising the wings are angled lateral outward from a centerline defined by the outlet.

3. The exhaust configuration according to claim 1, further comprising the diffuser outlet bottom wall forming a bottom wall edge spaced from the floor of the wet scrubber.

4. The exhaust configuration according to claim 3, further comprising the second edge of each of the wings spaced from the floor of the wet scrubber.

5. The exhaust configuration according to claim 1, further comprising each of the wings being generally triangular in shape.

6. The exhaust configuration according to claim 1, further comprising each of the wings having a triangular shape with a rounded tip.

7. The exhaust configuration according to claim 1, further comprising each of the wings having a trapezoidal shape.

8. The exhaust configuration according to claim 1, further comprising each of the wings having a rounded edge shape.

9. The exhaust configuration according to claim 1, further comprising the exhaust configuration including a pressure bar positioned spaced from the outlet and having surfaces for dividing the flow of the scrubbed air into vertical upward and vertical downward directions.

10. The exhaust configuration according to claim 1, further comprising the wet scrubber having a pair of the exhaust configurations including a first exhaust configuration and a second exhaust configuration, the first and second exhaust configurations aligned such that the diffusers of each of the first and second exhaust configurations are aligned with the diffuser of the first exhaust configuration exhausting the scrubber air into a back side of the diffuser of the second exhaust configuration.

11. The exhaust configuration according to claim 10, further comprising the wings of the first and the second exhaust configurations are angled outward from a centerline defined by the respective outlet at respective first and second angles, with the first exhaust configuration angle being greater than the second exhaust configuration angle.

12. The exhaust configuration according to claim 1, further comprising wherein the wet scrubber is part of the spray booth adapted for applying paint to motor vehicle bodies.

13. The exhaust configuration according to claim 11, further comprising wherein the wet scrubber is part of the spray booth having a generally downward flow pattern with the airflow in a generally vertically downward direction into the exhaust configuration.

* * * * *